(12) United States Patent
Cayton et al.

(10) Patent No.: US 11,491,434 B2
(45) Date of Patent: Nov. 8, 2022

(54) SORBENT COMPOSITIONS AND METHODS FOR THE REMOVAL OF CONTAMINANTS FROM A GAS STREAM

(71) Applicant: ADA Carbon Solutions, LLC, Littleton, CO (US)

(72) Inventors: Roger H. Cayton, Castle Rock, CO (US); Mowen Li, Highlands Ranch, CO (US); Micala D. Mitchek, Arvada, CO (US); Lingyan Song, Englewood, CO (US)

(73) Assignee: ADA Carbon Solutions, LLC, Littleton, CO (US)

( * ) Notice: Subject to any disclaimer, the term of this patent is extended or adjusted under 35 U.S.C. 154(b) by 290 days.

(21) Appl. No.: 16/418,975

(22) Filed: May 21, 2019

(65) Prior Publication Data

US 2020/0047107 A1 Feb. 13, 2020

Related U.S. Application Data

(60) Provisional application No. 62/674,467, filed on May 21, 2018.

(51) Int. Cl.
*B01D 53/02* (2006.01)
*B01D 53/64* (2006.01)

(52) U.S. Cl.
CPC ............. *B01D 53/02* (2013.01); *B01D 53/64* (2013.01); *B01D 2253/102* (2013.01);
(Continued)

(58) Field of Classification Search
CPC .. B01D 53/02; B01D 56/64; B01D 2253/102; B01D 2253/104; B01D 2253/106;
(Continued)

(56) References Cited

U.S. PATENT DOCUMENTS 4,094,777 A * 6/1978 Sugier .................... B01D 15/00
210/670
4,305,827 A * 12/1981 Sasaki ..................... B01J 20/20
210/688
(Continued)

FOREIGN PATENT DOCUMENTS

CA 2686986 11/2008
CA 2576210 6/2010
(Continued)

OTHER PUBLICATIONS

Shamraiz et al. (Fabrication and applications of copper sulfide (CuS) nanostructures, 2016, Journal of Solid State Chemistry, vol. 238, pp. 25-40). (Year: 2016).*
(Continued)

*Primary Examiner* — Youngsul Jeong
(74) *Attorney, Agent, or Firm* — Sheridan Ross P.C.

(57) ABSTRACT

A sorbent composition for the sequestration of mercury from a gas stream, a method for sequestering mercury from a gas stream and a method for the manufacture of a sorbent composition. The sorbent composition includes a highly porous particulate sorbent and at least two additive components, namely a non-halogen metal compound comprising a metal cation and an inorganic sulfur-containing compound, where at least a portion of the sulfur in the sulfur-containing compound has an oxidation state of equal to or less than +4. The method includes injecting the highly porous particulate sorbent and the two additive components into a gas stream, either discretely or as a single sorbent composition, to sequester mercury in the particulate sorbent. The method has a high degree of efficacy for mercury removal without requiring the addition of halogens to the gas stream.

35 Claims, 2 Drawing Sheets

(52) U.S. Cl.
CPC .. *B01D 2253/104* (2013.01); *B01D 2253/106* (2013.01); *B01D 2253/112* (2013.01); *B01D 2253/304* (2013.01); *B01D 2253/306* (2013.01); *B01D 2253/311* (2013.01); *B01D 2257/602* (2013.01); *B01D 2258/0283* (2013.01)

(58) Field of Classification Search
CPC ........ B01D 2253/112; B01D 2253/304; B01D 2253/306; B01D 2253/311; B01D 2257/602; B01D 2258/0283
See application file for complete search history.

(56) References Cited

U.S. PATENT DOCUMENTS

| | | | |
|---|---|---|---|
| 4,578,256 | A | 3/1986 | Nishino et al. |
| 5,492,882 | A | 2/1996 | Doughty et al. |
| 6,719,828 | B1 | 4/2004 | Lovell et al. |
| 7,048,781 | B1 | 5/2006 | Lovell |
| 7,183,235 | B2 | 2/2007 | Lovell et al. |
| 7,435,286 | B2 | 10/2008 | Olson et al. |
| 7,575,629 | B2 * | 8/2009 | Yang .................... B01J 20/0211 106/705 |
| 7,615,194 | B2 | 11/2009 | Matumura et al. |
| 7,722,843 | B1 | 5/2010 | Srinivasachar |
| 8,008,228 | B2 | 8/2011 | Heschel et al. |
| 8,309,046 | B2 | 11/2012 | Pollack et al. |
| 8,329,614 | B2 | 12/2012 | Chao et al. |
| 8,524,186 | B2 | 9/2013 | Kawamura et al. |
| 8,551,431 | B1 | 10/2013 | Adams et al. |
| 8,691,722 | B2 * | 4/2014 | Gadkaree .......... B01J 20/28045 502/417 |
| 8,715,599 | B2 | 5/2014 | Pollack et al. |
| 8,790,427 | B2 * | 7/2014 | O'Rear .............. B01D 53/1456 48/127.3 |
| 9,314,767 | B2 | 4/2016 | McMurray et al. |
| 9,468,904 | B2 | 10/2016 | McMurray et al. |
| 9,539,538 | B2 | 1/2017 | Wong et al. |
| 9,561,462 | B2 | 2/2017 | McMurray et al. |
| 10,035,126 | B2 | 7/2018 | McMurray et al. |
| 10,137,403 | B2 | 11/2018 | McMurray et al. |
| 10,159,928 | B2 | 12/2018 | McMurray |
| 10,307,706 | B2 | 6/2019 | Li et al. |
| 10,421,037 | B2 | 9/2019 | Li et al. |
| 10,449,492 | B2 | 10/2019 | Huston et al. |
| 10,456,745 | B2 | 10/2019 | Huston et al. |
| 2007/0254807 | A1 | 11/2007 | Bisque et al. |
| 2008/0207443 | A1 | 8/2008 | Gadkaree et al. |
| 2008/0292512 | A1 | 11/2008 | Kang |
| 2013/0157845 | A1 | 6/2013 | Nalepa et al. |
| 2014/0186625 | A1 | 7/2014 | Wong et al. |
| 2014/0191157 | A1 | 7/2014 | Wong et al. |
| 2015/0165416 | A1 | 6/2015 | Wong et al. |
| 2015/0235326 | A1 | 8/2015 | Hansen et al. |
| 2016/0214078 | A1 | 7/2016 | Li et al. |
| 2016/0296908 | A1 | 10/2016 | Li et al. |
| 2017/0043316 | A1 | 2/2017 | Li et al. |
| 2017/0043321 | A1 | 2/2017 | Li et al. |
| 2018/0001257 | A1 | 1/2018 | Wong et al. |
| 2018/0028970 | A1 | 2/2018 | Huston et al. |
| 2018/0029006 | A1 | 2/2018 | Li et al. |
| 2018/0029008 | A1 | 2/2018 | Li et al. |
| 2018/0029009 | A1 | 2/2018 | Li et al. |
| 2018/0170773 | A1 | 6/2018 | Mitchek et al. |
| 2019/0291041 | A1 | 9/2019 | McMurray et al. |
| 2019/0358578 | A1 | 11/2019 | McMurray et al. |
| 2020/0001228 | A1 | 1/2020 | Li et al. |
| 2021/0188665 | A1 | 6/2021 | Mitchek et al. |
| 2021/0316273 | A1 | 10/2021 | Li et al. |
| 2022/0152578 | A1 | 5/2022 | Li et al. |

FOREIGN PATENT DOCUMENTS

| | | |
|---|---|---|
| CA | 2926826 | 5/2018 |
| CN | 1186069 | 7/1998 |

OTHER PUBLICATIONS

International Preliminary Report on Patentability for International (PCT) Patent Application No. PCT/US2019/033422, dated Dec. 3, 2020 11 pages.
U.S. Appl. No. 15/930,145, filed May 12, 2020, Li et al.
U.S. Appl. No. 16/911,161, filed Jun. 24, 2020, Wong et al.
U.S. Appl. No. 16/657,634, filed Oct. 18, 2019, Huston et al.
U.S. Appl. No. 16/725,993, filed Dec. 23, 2019, Huston et al.
UOP 1, "UOP adsorbent solutions help prevent mercury contamination," 2011; p. 3, Sections entitled UOP GB Adsorbent and UOP HgSIV Advsorbents. (https://www.uop.com/?document=uop-mercury-removal-for-natural-gas-production-brochure&download=1) 4 pages.
UOP 2, "Advanced Mercury Removal Technologies," 2009; p. 6 and 13. (https://www.uop.com/?document=uop-advanced-mercury-removal-technologies-technical-presentation&download=1) 22 pages.
International Search Report for International (PCT) Patent Application No. PCT/US2019/033422, dated Aug. 28, 2019 5 pages.
U.S. Appl. No. 17/559,892, filed Dec. 22, 2021, Li et al.
U.S. Appl. No. 17/705,648, filed Mar. 28, 2022, Li et al.

\* cited by examiner

SORBENT COMPOSITIONS AND METHODS FOR THE REMOVAL OF CONTAMINANTS FROM A GAS STREAM

CROSS-REFERENCE TO RELATED APPLICATIONS

This application claims the priority benefit under 35 USC § 119(e) of U.S. Provisional Patent Application No. 62/674,467 filed on May 21, 2018, which is incorporated herein by reference in its entirety.

FIELD

This disclosure relates to the field of sorbent compositions, particularly sorbent compositions that are useful for the removal and sequestration of contaminants such as mercury from a flue gas stream, and to methods for the removal of contaminants from a flue gas stream.

BACKGROUND

Mercury is known to be a highly toxic compound. Mercury exposure at appreciable levels can lead to adverse health effects for people of all ages, including harm to the brain, heart, kidneys, lungs, and immune system. Although mercury is naturally occurring, most mercury emissions result from various human activities such as burning fossil fuels and other industrial processes.

One technology for mercury control from coal-fired power plants is activated carbon injection ("ACI"). Activated carbon injection involves the injection of sorbents, typically including powder activated carbon ("PAC"), into the flue gas stream emitted by the boiler of a power plant. Powder activated carbon is a porous carbonaceous material having a high surface area, which exposes significant amounts of beneficial chemically functional and reactive sites and which creates high adsorptive potential for many compounds, including capturing mercury from the flue gas. Activated carbon injection technology has shown the potential to control mercury emissions in most coal-fired power plants, even those plants that may achieve some mercury control through control devices designed for other pollutants, such as wet or dry scrubbers used to control sulfur dioxide and acid gases.

The capture and removal of mercury from a boiler flue gas by activated carbon injection can be characterized by three primary steps, which may occur sequentially or simultaneously: (1) contact of the injected sorbent particle, such as PAC, with the mercury species, which is typically present in very dilute concentrations in the flue gas (e.g., <100 parts per billion); (2) oxidation of elemental mercury (i.e., $Hg^0$), which is relatively inert and not easily adsorbed, into an oxidized mercury species (e.g., $Hg^+$ and $Hg^{+2}$), which is more readily adsorbable and is significantly more soluble in an aqueous solubilizing medium such as water; and (3) capture of the oxidized mercury species by the pores of the sorbent where it is held tightly (e.g., sequestered) without being released. Flue gas streams traverse the ductwork at very high velocities, such as in excess of 25 feet/second. Therefore, once injected, the particulate sorbent composition must rapidly contact, oxidize and sequester the mercury. In some instances, the sorbent only has a residence time of about 1 to 2 seconds in the flue gas.

Sorbent compositions for the sequestration of mercury often include a halogen to facilitate oxidation of the elemental mercury, i.e., step (2) above. See, for example, U.S. Pat. No. 9,539,538 by Wong et al., which is incorporated herein by reference in its entirety. In some cases the halogen is present in the sorbent in concentrations of 10 wt. % or more. In other cases the halogen, such as bromine, is added separately from the sorbent as in U.S. Pat. No. 8,309,046 to Pollack et al. However, the addition of halogens such as bromine to the flue gas stream may cause corrosion of treatment units. In addition, non-protective scales can be formed because of the presence of hydrobromic acid (HBr) in the flue gas. In addition to the corrosive effects of adding bromine into the flue gas stream, several other plant issues can also arise; bromine accumulation in the wet scrubbers, deterioration of the fabrics in a baghouse, and the decrease of selenium capture within the plant's native fly ash.

SUMMARY

While halogens are known to be effective for the oxidation of mercury to enhance sequestration by a particulate sorbent, e.g., by PAC, halogens can be highly corrosive with respect to the equipment used in power plants where carbonaceous materials are combusted, e.g., for power generation. Halogens may also contaminate the waste water discharged from the power plant, and when combined with organic residual in the water can lead to undesirable formation of trihalomethanes.

There is a need for sorbent compositions that can be injected into flue gas streams to effectively sequester contaminants such as mercury, while reducing the problems associated with the use of halogens as an oxidant, e.g., for mercury.

In one embodiment, a sorbent composition for the capture of contaminants from a gas stream is disclosed. The sorbent composition comprises a particulate sorbent, a non-halogen metal compound comprising a metal cation, and an inorganic sulfur-containing compound, wherein at least a portion of the sulfur in the sulfur-containing compound has an oxidation state of equal to or less than +4.

The foregoing sorbent composition may be subject to refinements, characterizations and/or additional features, which may be implemented alone or in any combination. As noted above, it is an advantage that the sorbent compositions disclosed herein can be effective for the sequestration of mercury, e.g. from a flue gas stream, without the need for significant additions of halogens, e.g., of Br, Cl, F or I. In one refinement, the sorbent composition comprises not greater than about 0.5 wt. % halogens. In a further refinement, the sorbent composition comprises not greater than about 0.1 wt. % halogens. In yet a further refinement, the sorbent composition comprises substantially no halogens.

In one characterization, the particulate sorbent is selected from the group consisting of alumina sorbents, silica sorbents and aluminosilicate sorbents. In another characterization, the particulate sorbent comprises a carbonaceous sorbent. In one refinement the carbonaceous sorbent comprises activated carbon, and in a further refinement, the activated carbon comprises powered activated carbon. In another refinement, the carbonaceous sorbent is derived from coal.

In another characterization, the particulate sorbent has a fine particle size, and in one refinement, the particulate sorbent has a median particle size of not greater than about 50 μm. In a further refinement, the sorbent has a median particle size of not greater than about 30 μm, and in yet a further refinement, the particulate sorbent has a median particle size of not greater than about 20 μm. In another characterization, the particulate sorbent has a median particle size of at least about 2 µm, and in yet a further refinement the particulate sorbent has a median particle size of at least about 5 µm.

In another characterization, the particulate sorbent has a sum of micropore volume, mesopore volume and macropore volume of at least about 0.2 cc/g. In another characterization, the particulate sorbent has a surface area of at least about 350 m$^2$/g.

In another characterization, the metal cation is selected from the group consisting of cations of Fe, Cu, V, Mn, Co, Ni and Zn. In one refinement, the metal cation selected from the cations of Fe, Cu, V, Mn, Co, Ni and Zn has an oxidation state of +2 or +3, and in a further refinement has an oxidation state of +3. In another refinement, the metal cation is selected from the cations of Fe and Cu.

In yet another characterization, the non-halogen metal compound is selected from the group consisting of a sulfate compound and a nitrate compound. In one refinement, the non-halogen metal compound is selected from the group consisting of $Fe_2(SO_4)_3$, $FeSO_4$ and $CuSO_4$. In yet a further refinement, the non-halogen metal compound is $Fe_2(SO_4)_3$.

In another characterization, the sorbent composition comprises at least about 0.1 wt. % of the metal cation. In one refinement, the sorbent composition comprises at least about 0.5 wt. % of the metal cation. In another characterization, the sorbent composition comprises not greater than about 20 wt. % of the metal cation, and in one refinement the sorbent composition comprises not greater than about 5 wt. % of the metal cation.

In another refinement, the sulfur in the sulfur-containing compound is a constituent of a sulfur-containing anion. In one characterization, the sulfur-containing anion is selected from the group consisting of thiocyanate $(SCN)^{1-}$, thiosulfate $(S_2O_3)^{2-}$, tetrathionate $(S_4O_6)^{2-}$ and polythionate $(SO_3-S_n-SO_3)^{2-}$. In one refinement the sulfur-containing anion is thiocyanate $(SCN)^{1-}$, and in a further refinement, the sulfur-containing compound is selected from the group consisting of sodium thiocyanate (NaSCN) and ammonium thiocyanate ($NH_4SCN$). In another refinement, the sulfur-containing anion is thiosulfate $(S_2O_3)^{2-}$, and in a further refinement the sulfur-containing compound is selected from the group consisting of sodium thiosulfate ($Na_2S_2O_3$) and ammonium thiosulfate (($NH_4)_2S_2O_3$).

In another characterization, the sorbent composition comprises at least about 0.1 wt. % sulfur from the sulfur-containing compound, and in one refinement the sorbent composition comprises at least about 1.0 wt. % sulfur from the sulfur-containing compound. In another characterization, the sorbent composition comprises not greater than about 25 wt. % sulfur from the sulfur-containing compound, and in further refinement the sorbent composition comprises not greater than about 10 wt. % sulfur from the sulfur-containing compound.

In yet another characterization, the sorbent composition comprises free-flowing particles of the particulate sorbent, e.g., particles that are capable of being injected into a flue gas stream and subsequently collected in a particle collection device. In another characterization, at least one of the non-halogen metal compound and the inorganic sulfur-containing compound comprise particulates that are admixed with the particulate sorbent. In another characterization, at least one of the non-halogen metal compound and the inorganic sulfur-containing compound are coated onto the particulate sorbent.

In another embodiment, a method for the treatment of a gas stream to capture contaminants from the gas stream is disclosed. The method includes the steps of contacting the flue gas stream with a particulate sorbent to disperse the particulate sorbent within the flue gas, contacting the flue gas stream with a non-halogen metal compound comprising a metal cation, contacting the flue gas stream an inorganic sulfur-containing compound, wherein at least a portion of the sulfur in the sulfur-containing compound has an oxidation state of equal to or less than +4, and separating the particulate sorbent from the flue gas stream.

The foregoing method may be subject to characterizations, refinements and/or additional steps, which may be implemented alone or in any combination. In one characterization, the contacting steps are carried out by contacting the flue gas stream with a sorbent composition comprising the particulate sorbent, the non-halogen metal compound and the inorganic sulfur-containing compound. For example, the sorbent composition may be a sorbent composition as disclosed herein. In one refinement, the sorbent composition comprises not greater than about 0.5 wt. % halogens, and in another refinement the sorbent composition comprises not greater than about 0.1 wt. % halogens. In yet another refinement, the sorbent composition comprises substantially no halogens. In another refinement, the sorbent composition is in the form of free-flowing particulates, and the contacting steps comprise injecting the free-flowing sorbent composition particulates into the flue gas stream.

In another characterization, the step of contacting the flue gas stream with a particulate sorbent comprises injecting the particulate sorbent into the flue gas stream. In one refinement, the step of contacting the flue gas stream with the inorganic sulfur-containing compound comprises injecting the inorganic sulfur-containing compound into the flue gas stream. In another refinement, the inorganic sulfur-containing compound is injected into the flue gas stream as a discrete component, i.e., the inorganic sulfur-containing compound is not intimately associated with the particulate sorbent. In another refinement, the step of contacting the flue gas stream with the non-halogen metal compound comprises injecting the non-halogen metal compound into the flue gas stream. In one particular refinement, the non-halogen metal compound is injected into the flue gas stream as a discrete component.

In another characterization, the gas stream is a flue gas stream emanating from a boiler. In one refinement, the gas stream is a flue gas stream emanating from a coal-fired boiler. In yet another refinement, contaminants comprise mercury.

In another embodiment, a method for the manufacture of a sorbent composition is disclosed. The method includes the steps of contacting a non-halogen metal compound with a particulate sorbent and contacting an inorganic sulfur-containing compound with the particulate sorbent, the sulfur-containing compound comprising a sulfur-containing anion, wherein at least a portion of the sulfur in the sulfur-containing compound has an oxidation state of equal to or less than +4.

The foregoing method may be subject to refinements, characterizations and/or additional steps, which may be implemented alone or in any combination. In one characterization, the non-halogen transition metal compound is in the form of a solution during the step of contacting the non-halogen transition metal compound with the particulate sorbent. In another characterization, the inorganic sulfur-containing compound is in the form of a solution during the step of contacting the inorganic sulfur-containing compound with the particulate sorbent. In one refinement, the non-halogen transition metal compound and the inorganic sulfur-containing compound are in the form of a single solution such that the contacting steps are carried out simultaneously.

In another characterization, the sorbent composition is transported to a point-of-use, and no effective amount of a halogen is added to the sorbent composition before transporting to the point-of-use.

DESCRIPTION OF THE EMBODIMENTS

Figure 1:
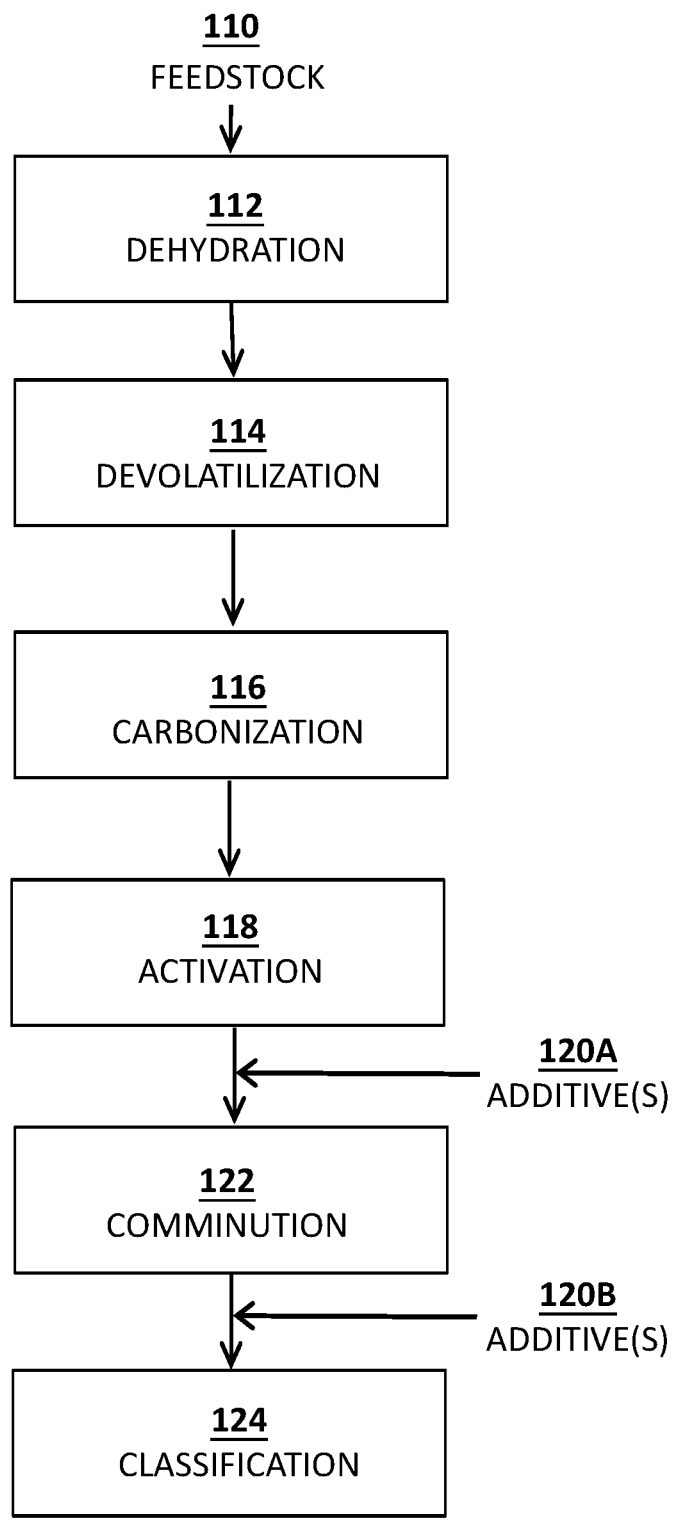
FIG. 1 illustrates a boiler plant configuration and method for the capture and sequestration of contaminants from a flue gas stream.

It is an advantage of the sorbent composition disclosed herein that the composition may be highly effective for the sequestration of heavy metals, particularly for the sequestration of mercury from a flue gas stream, without the need for a significant concentration of halogens in the composition. In one embodiment, the present disclosure is directed to a sorbent composition for the capture of contaminants from a gas stream. The sorbent composition includes a particulate sorbent, a non-halogen metal compound comprising a metal cation, and an inorganic sulfur-containing compound comprising a sulfur-containing anion. At least a portion of the sulfur in the sulfur-containing compound has an oxidation state (e.g., valence) of equal to or less than +4, e.g., of 0, +2 or −2. As used herein, the term "compound" encompasses molecular groups having at least two different constituents. By way of example, non-halogen metal compounds do not include elemental metals, and sulfur-containing compounds do not include elemental sulfur (e.g., Sa).

The sorbent composition disclosed herein may be in the form of a powder, i.e., free flowing particles of the particulate sorbent combined with the non-halogen metal compound and the inorganic sulfur-containing compound. As is discussed below, the non-halogen metal compound and/or the inorganic sulfur-containing compound may be in the form of distinct particulates that are admixed with the particulate sorbent, and/or may be disposed on (e.g., coated on) the particulate sorbent.

The particulate (e.g., solid) sorbent is selected to have a relatively high porosity and relatively high surface area for favorable adsorption properties. For example, the particulate sorbent may be selected from alumina (e.g., $Al_2O_3$), silica ($SiO_2$), silicates including alum inosilicates, carbonaceous materials, and combinations of these materials. In a particular embodiment, the particulate sorbent comprises a carbonaceous material. Carbonaceous materials may include, but are not limited to, those that are derived from (e.g., formed from) any type of coal, including but not limited to lignite coal, sub-bituminous coal, bituminous coal, and anthracitic coal, charcoal, pitch, polyacrylonitrile (PAN), coconut shells, wood, biomass, and the like. For example, the carbonaceous material may comprise activated carbon that is derived from one or more of the foregoing materials. Activated carbon is a form of carbonaceous material that has a high degree of microporosity and a high surface area. In certain embodiments, the carbonaceous material is activated carbon that is derived from a coal feedstock, e.g., a coal-derived activated carbon. That is, the raw material that is processed to form the activated carbon includes coal. In one characterization the carbonaceous material comprises activated carbon that is derived from lignite coal. In another characterization, the particulate sorbent comprises powdered activated carbon (PAC) that is derived from coal. PAC derived from coal may have many advantageous morphological properties, such as high surface area, high overall porosity and desirable pore size characteristics that are advantageous for the sequestration (e.g., adsorption) of species such as mercury.

The median average particle size (D50) of the particulate sorbent (e.g., solid sorbent particulates) may be relatively small, particularly when the sorbent composition is engineered for the capture of mercury or other heavy metal contaminants from a flue gas stream, e.g., by injection of the sorbent composition into the flue gas stream. In one characterization, the median average particle size of the particulate sorbent is not greater than about 50 μm, such as not greater than about 30 μm, or even not greater than about 25 μm. For the sequestration of mercury from a flue gas stream by injection of the sorbent composition, it may be desirable to utilize a particulate sorbent having a median average particle size of not greater than about 20 μm, not greater than about 15 μm or even not greater than about 12 μm. Very small particulates may, however, be difficult to implement. In certain embodiments, the median particle size may be at least about 2 μm, such at least about 5 μm, such as at least about 6 μm. The median average particle size of the particulate sorbent may be measured using techniques such as light scattering techniques (e.g., using a Saturn DigiSizer II, available from Micromeritics Instrument Corporation, Norcross, Ga.).

In one characterization, the particulate sorbent (e.g., PAC) has a relatively high total pore volume and a well-controlled distribution of pores, particularly among the mesopores (i.e., from 20 Å to 500 Å width) and the micropores (i.e., not greater than 20 Å width). A well-controlled distribution of micropores and mesopores is desirable for effective removal of mercury from the flue gas stream. While not wishing to be bound by any theory, it is believed that the mesopores are the predominant structures for capture and transport of the oxidized mercury species to the micropores, whereas micropores are the predominate structures for sequestration of the oxidized mercury species.

The total pore volume of the particulate sorbent (sum of micropore volume plus mesopore volume plus macropore volume) may be at least about 0.10 cc/g, such as at least 0.20 cc/g, at least about 0.25 cc/g or even at least about 0.30 cc/g. The micropore volume of the particulate sorbent may be at least about 0.10 cc/g, such as at least about 0.15 cc/g. Further, the mesopore volume of the particulate sorbent may be at least about 0.10 cc/g, such as at least about 0.15 cc/g. In one characterization, the ratio of micropore volume to mesopore volume may be at least about 0.7, such as 0.9, and may be not greater than about 1.5. Such levels of micropore volume relative to mesopore volume may advantageously enable efficient capture and sequestration of oxidized mercury species by the particulate sorbent. Pore volumes may be measured using gas adsorption techniques (e.g., $N_2$ adsorption) using instruments such as a TriStar II Surface Area Analyzer 3020 or ASAP 2020 (Micromeritics Instruments Corporation, Norcross, Ga., USA).

The particulate sorbent may also have a relatively high surface area. For example, the particulate sorbent may have a surface area of at least about 350 $m^2/g$, such as at least about 400 $m^2/g$ or even at least about 500 $m^2/g$. Surface area may be calculated using the Brunauer-Emmett-Teller (BET) theory that models the physical adsorption of a monolayer of nitrogen gas molecules on a solid surface and serves as the basis for an analysis technique for the measurement of the specific surface area of a material. BET surface area may be measured using the Micromeritics TriStar II 3020 or ASAP 2020 (Micromeritics Instrument Corporation, Norcross, Ga.).

The sorbent composition also includes a non-halogen metal compound. A non-halogen metal compound is a a metal compound that does not include a halogen as a constituent of the compound, e.g., compounds that do not include fluorine (F), chlorine (Cl), bromine (Br) or iodine (I) as a constituent. In one characterization, the non-halogen metal compound includes a metal selected from the group consisting of iron (Fe), copper (Cu), vanadium (V), manganese (Mn), cobalt (Co), nickel (Ni), and zinc (Zn). The metal compound is selected from those compounds that do not include a halogen, e.g., compounds that do not include fluorine (F), chlorine (Cl), bromine (Br) or iodine (I). The metal cation may be selected from the group consisting of a cation of iron (Fe), copper (Cu), nickel (Ni), cobalt (Co), manganese (Mn), vanadium (V) and zinc (Zn). Non-halogen metal compounds including iron and/or copper may be particularly advantageous for many applications. In any case, the metal cation in the non-halogen metal compound may have an oxidation state (e.g., a valence) of +2 or +3, and in certain embodiments the metal cation in the non-halogen metal compound has an oxidation state of +3.

The non-halogen metal compound may advantageously be selected from compounds that include an oxyanion, such as a sulfur oxyanion or a nitrogen oxyanion. In certain embodiments, the non-halogen metal compound comprises a metal selected from iron, copper, vanadium, manganese, cobalt, nickel, and zinc, and a sulfate anion ($SO_4^{2-}$), or a metal selected from iron, copper, vanadium, manganese, cobalt, nickel, and zinc, and a nitrate anion ($NO_3^-$). Examples of such compounds include, but are not limited to, those listed in Table I.

TABLE I

Non-Halogen Metal Compounds

| Compound Name | Formula |
|---|---|
| Iron (III) sulfate | $Fe_2(SO_4)_3$ |
| Iron (II) sulfate | $FeSO_4$ |
| Copper (II) sulfate | $CuSO_4$ |
| Manganese (III) sulfate | $Mn_2(SO_4)_3$ |
| Nickel (II) sulfate | $NiSO_4$ |
| Nickel (III) sulfate | $Ni_2(SO_4)_3$ |
| Ferrous ammonium sulfate | $(NH_4)_2Fe(SO_4)_2$ |
| Iron (II) nitrate | $Fe(NO_3)_2$ |
| Copper (II) nitrate | $Cu(NO_3)_2$ |
| Nickel (II) nitrate | $Ni(NO_3)_2$ |
| Iron (III) nitrate | $Fe(NO_3)_3$ |
| Manganese (III) nitrate | $Mn(NO_3)_3$ |
| Nickel (III) nitrate | $Ni(NO_3)_3$ |

In one particular embodiment, the non-halogen metal compound may be selected from compounds including iron or copper with a sulfate anion, such as $Fe_2(SO_4)_3$, $FeSO_4$, $CuSO_4$ and combinations thereof. It will be appreciated that the non-halogen metal compounds may also be in a hydrated form, e.g., $Fe_2(SO_4)_3 \cdot 7H_2O$, and reference herein to any such non-halogen metal compound includes hydrated forms of the compound.

The sorbent composition also includes an inorganic sulfur-containing compound that includes a sulfur-containing anion, where at least a portion of the sulfur in the sulfur-containing compound has an oxidation state (e.g., a valence) of equal to or less than +4, e.g., an oxidation state of 0, +2 or −2. For example, the sulfur-containing anion may be selected from the group consisting of thiocyanate $(SCN)^{1-}$, thiosulfate $(S_2O_3)^{2-}$, tetrathionate $(S_4O_6)^{2-}$ and polythionate $(SO_3-S_n-SO_3)^{2-}$. Examples of such compounds include, but are not limited to, the compounds listed in Table II.

TABLE II

Sulfur-Containing Compounds

| Compound Name | Formula | S Oxidation State(s) |
|---|---|---|
| Sodium thiocyanate | NaSCN | −2 |
| Ammonium thiocyanate | $NH_4SCN$ | −2 |
| Potassium thiocyanate | KSCN | −2 |
| Calcium thiocyanate | $Ca(SCN)_2$ | −2 |
| Sodium thiosulfate | $Na_2S_2O_3$ | −2, +6 |
| Ammonium thiosulfate | $(NH_4)_2S_2O_3$ | −2, +6 |
| Potassium thiosulfate | $K_2S_2O_3$ | −2, +6 |
| Calcium thiosulfate | $CaS_2O_3$ | −2, +6 |
| Sodium tetrathionate | $Na_2S_4O_6$ | 0, +5 |

In one particular embodiment, the sulfur-containing anion is thiocyanate. For example, the sulfur-containing compound may be selected from sodium thiocyanate and ammonium thiocyanate. In another particular embodiment, the sulfur-containing anion is thiosulfate $(S_2O_3)^{2-}$. For example, the sulfur-containing compound may be selected from sodium thiosulfate $(Na_2S_2O_3)$ and ammonium thiosulfate $((NH_4)_2S_2O_3)$.

The sorbent composition comprises at least the three foregoing components, namely a particulate sorbent, a non-halogen metal compound, and an inorganic sulfur-containing compound. The components are combined in the appropriate concentrations and/or ratios to provide favorable adsorption properties, e.g., favorable sequestration of mercury from a flue gas stream. In one characterization, the concentration of the metal cation (i.e., from the non-halogen metal compound) is at least about 0.1 wt. % of the sorbent composition, such as at least about 0.25 wt. %, such as at least about 0.5 wt. %, or even at least about 1.0 wt. % of the sorbent composition. In another characterization, the concentration of the metal cation is not greater than about 20 wt. % of the sorbent composition, such as not greater than about 15 wt. %, such as not greater than about 10 wt. %, or even not greater than about 5 wt. % of the sorbent composition.

In another embodiment, the concentration of the inorganic sulfur-containing compound is at least about 0.05 wt. % of the sorbent composition, such as at least about 0.1 wt. %, such as at least about 1.0 wt. %, or even at least about 2.0 wt. % of the sorbent composition. In another characterization, the concentration of the inorganic sulfur-containing compound is not greater than about 30 wt. % of the sorbent composition, such as not greater than about 25 wt. %, such as not greater than about 15 wt. %, such as not greater than about 10 wt. %, or even not greater than about 5 wt. % of the sorbent composition.

In accordance with the foregoing embodiments, the concentration of the particulate sorbent may be at least about 50 wt. % of the of the sorbent composition, such as at least about 60 wt. %, such as at least about 70 wt. %, such as at least about 80 wt. %, such as at least about 90 wt. %, or even at least about 95 wt. % of the sorbent composition. Typically, the concentration of the particulate sorbent will be not greater than about 99.5 wt. % of the sorbent composition, such as not greater than about 99 wt. % of the sorbent composition.

The sorbent composition disclosed herein may include other additives in addition to the non-halogen metal compound and the inorganic sulfur-containing compound according to the present disclosure. However, as is discussed above, it is preferred that no effective amount of a halogen species is added to the sorbent composition.

As is discussed above, it is an advantage of the sorbent compositions disclosed herein that the compositions may be highly effective for the sequestration of heavy metals, particularly for the sequestration of mercury from a flue gas stream, without the need for a significant concentration of halogens to oxidize the mercury. In accordance with one embodiment of the present disclosure, the sorbent composition comprise not greater than about 1 wt. % halogens, such as not greater than about 0.5 wt. % halogens, or even not greater than about 0.1 wt. % halogens. In another embodiment, the sorbent composition may include substantially no added halogens, i.e., no concentration of halogens beyond the halogens that are naturally present in the particulate sorbent. For example, when the particulate sorbent in derived from lignite coal, the particulate sorbent may comprise up to about 0.08 wt. % native halogens, such as about 0.02 wt. % of native halogens, i.e., halogens that originated from the lignite coal, typically comprising Cl and/or F. In other embodiments, the sorbent composition comprises substantially no halogens.

Another embodiment of the present disclosure is directed to a method for the manufacture of a sorbent composition, i.e., a sorbent composition disclosed above. The method includes the steps of contacting the particulate sorbent with the non-halogen metal compound and with the inorganic sulfur-containing compound comprising a sulfur-containing anion, wherein at least a portion of the sulfur in the sulfur-containing compound has an oxidation state of less than +4, e.g., of 0, +2 or −2, with the particulate sorbent. The contacting step can include, for example, mixing (e.g., dry blending) the constituents to form a homogeneous mixture of the individual constituents.

In one characterization, the non-halogen metal compound is in solution (e.g., in an aqueous solution) during the step of contacting the non-halogen metal compound with the particulate sorbent. In another characterization, the inorganic sulfur-containing compound is in solution (e.g., an aqueous solution) during the step of contacting the inorganic sulfur-containing compound with the particulate sorbent. For example, the non-halogen metal compound and the inorganic sulfur-containing compound may be included in a single solution such that the contacting steps are carried out simultaneously. By way of example, such solution(s) may be sprayed onto the particulate sorbent or the particulate sorbent may be immersed in the solution(s) for a period of time. When the non-halogen metal compound and the inorganic sulfur-containing compound are contacted with the particulate sorbent in the form of a solution and are subsequently dried, the compounds may form a coating on the surface of the particulate sorbent.

FIG. 1 is a flow sheet that illustrates an exemplary method for the manufacture of a sorbent composition in accordance with one embodiment, i.e., for the manufacture of a sorbent composition according to the present disclosure. The manufacturing process may begin with a carbonaceous feedstock 110 such as coal, e.g., lignite coal, anthracitic coal, bituminous coal or sub-bituminous coal. The feedstock 110 is subjected to an elevated temperature and one or more oxidizing gases under exothermic conditions for a period of time to increase surface area, create porosity, alter surface chemistry, and expose and exfoliate native minerals previously contained within feedstock. The specific steps in the process illustrated in FIG. 1 include: (1) dehydration 112, where the feedstock is heated to remove free and bound water, typically occurring at temperatures ranging from 100° C. to 150° C.; (2) devolatilization 114, where free and weakly bound volatile organic constituents are removed, typically occurring at temperatures above 150° C.; (3) carbonization 116, where non-carbon elements continue to be removed and elemental (fixed) carbon is concentrated and transformed into random amorphous structures, typically occurring at temperatures around 350° C. to 800° C.; and (4) activation 118, where steam, air or another oxidizing agent is added and pores are developed, typically occurring at temperatures above 800° C. The manufacturing process may be carried out, for example, in a multi-hearth or rotary furnace. The manufacturing process is not discrete and steps can overlap and use various temperatures, gases and residence times within the ranges of each step to promote desired surface chemistry and physical characteristics of the manufactured product.

After activation 118, the thermally treated product (e.g., granular activated carbon) may be subjected to a comminution step 122 to reduce the particle size (e.g., the median particle size) of the product (e.g., to form powdered activated carbon). Comminution 122 may occur, for example, in a mill such as a roll mill, jet mill or other like device. Comminution 122 may be carried out for a time sufficient to reduce the median (D50) particle size of the thermally treated product, e.g., to not greater than about 100 μm, such as not greater than about 75 μm, such as not greater than about 50 μm, such as not greater than about 30 μm, such as not greater than about 20 μm or even not greater than about 15 μm.

In the event that manufacturing conditions result in a greater number of carbonaceous particles that have a very fine size than is desired, classification 124 may be carried out to remove such very fine particles from the larger carbonaceous particles. For example, classification 124 may be carried out using an air classifier, screen/mesh classification (e.g., vibrating screens) or centrifugation. Smaller particles may also be agglomerated to reduce the concentration of fine particles.

One or more additives may be contacted with the activated carbon during manufacture, including but not limited to the non-halogen metal compound and the inorganic sulfur-containing compound according to the present disclosure. For example, the additives may be in the form of one or more solutions that may be contacted with (e.g., sprayed onto) the sorbent prior to 120A or after 120B comminution 122. In this regard, the non-halogen metal compound and the inorganic sulfur-containing compound may be coated on and/or impregnated into the solid sorbent. Alternatively, or in addition, particulates (e.g., dry particulates) of those additives may be admixed with the sorbent prior to 120A and/or after 120B comminution 122.

In another characterization, the method includes facilitating the transport of the sorbent composition to a point-of-use, wherein no halogen species (e.g., no effective amount of a halogen species to enhance oxidation of mercury) is added to the sorbent composition before being transported to the point-of-use.

The present disclosure is also related to a method for the treatment of a gas stream to capture contaminants from the gas stream. The method includes the steps of contacting the gas stream with at least a particulate sorbent, a non-halogen metal compound as described above, and with an inorganic sulfur-containing compound as is describe above. These components may be contacted with the gas stream by injecting a sorbent composition into the flue gas stream, where the sorbent composition includes each of the three components, as is described above. That is, the sorbent composition that is contacted with the gas stream (e.g., is injected into the gas stream) may include a particulate sorbent, a non-halogen metal compound comprising a metal cation selected from iron, copper, vanadium, manganese, cobalt, nickel, and zinc, and an inorganic sulfur-containing compound comprising a sulfur-containing anion, where at least a portion of the sulfur in the sulfur-containing compound has an oxidation state of less than +4, e.g., of 0, +2 or −2.

Alternatively, or additionally, one or more of the components may be contacted with the gas stream as a discrete component, e.g., where the discrete component is not associated with (e.g., admixed with or coated onto) another component. For example, the particulate sorbent may be contacted with the gas stream as a discrete component and an admixture of the non-halogen metal compound and the sulfur-containing compound may be contacted with the gas stream independent from the particulate sorbent, e.g., at a separate injection point. Alternatively, one of the non-halogen metal compound or the sulfur-containing compound may be associated with (e.g., admixed with or coated onto) the particulate sorbent, while the other component is contacted with the gas stream as a discrete component. In another alternative, each of the three components may be contacted with the gas stream as a discrete component.

The flue gas stream may be a flue gas stream emanating from a boiler. For example, the method may include the use of a coal-fired boiler wherein coal is combusted to generate energy. The combustion of coal typically generates undesirable contaminants that must be removed from the flue gas, including heavy metals such as mercury (Hg). In certain embodiments, the flue gas stream has relatively low concentration of acid gasses. For example, the flue gas stream may comprise not greater than about 5 ppm $SO_3$, such as not greater than about 3 ppm $SO_3$.

Figure 2:
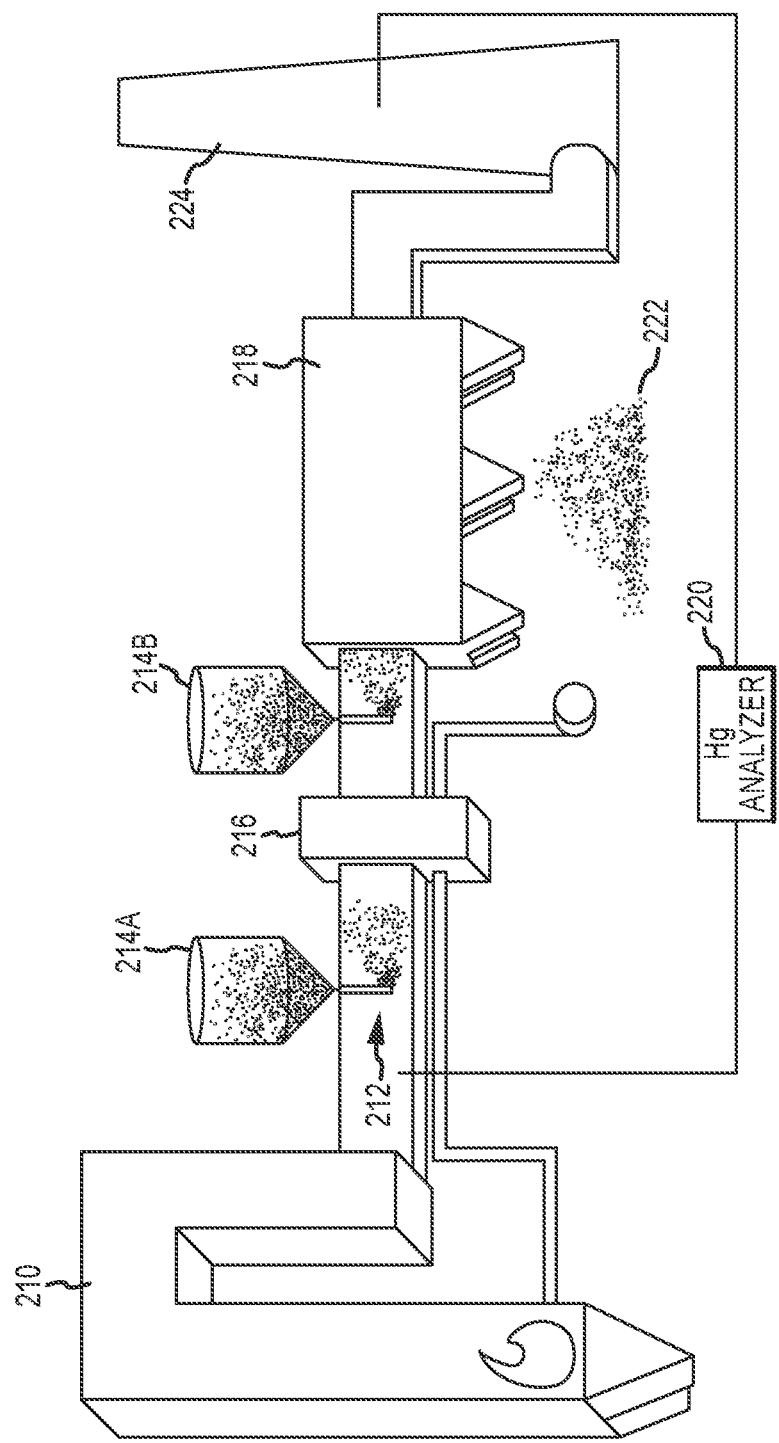
FIG. 2 illustrates a flowsheet for the production of a sorbent composition according to an embodiment of the present disclosure.

FIG. 2 schematically illustrates a system and method for removal of mercury from a flue gas stream using sorbent injection to contact the sorbent composition with the flue gas stream. The flue gas stream 212 exits a boiler 210 where a feedstock such as coal has been combusted. The flue gas stream 212 as it exits the boiler 210 typically has a temperature of from about 600° F. to about 900° F. As illustrated in FIG. 2, the flue gas stream 212 may then proceed to an air preheater unit 216 where the temperature of the flue gas stream 212 is reduced, generally to about 325° F. However, if the air preheater unit 212 is not operating efficiently, or there is no air preheater unit, as is frequently the case at industrial boiler sites, the flue gas stream temperature may exceed 325° F., e.g., being at or above about 340° F., being even as high as about 600° F. at the entrance to the particulate matter collection device.

After the air preheater unit 216, the flue gas stream 212 may be introduced to a particulate matter collection device 218 such as an electrostatic precipitator (ESP) or a fabric filter bag house which removes particulate matter from the flue gas stream 212, before exiting out a stack 224. For example, a cold-side (i.e., after the air preheater unit) electrostatic precipitator can be used. It will be appreciated by those skilled in the art that the plant may include other devices not illustrated in FIG. 2, such as a selective catalytic reduction unit (SCR) and the like, and may have numerous other configurations.

In order to capture mercury from the flue gas stream 212, a sorbent composition (e.g., comprising the three components as disclosed above) may be introduced to (e.g., injected into) and contacted with the flue gas stream 212 either before 214A or after 214B the air preheater unit 216, but before the particulate matter collection device 118 which will remove it from the flue gas stream 212. As is disclosed above, one or more of the components may be introduced into the flue gas stream 212 as a discrete component. In this characterization, any one or all three components may be introduced before 214A the air preheater unit 216 or after 214B the air preheater unit 216. Merely by way of example, the non-halogen metal compound and the sulfur-containing compound may be injected into the flue gas stream 212 before 214A the air preheater unit 216 (e.g., discretely or as an admixture), and the particulate sorbent may be injected into the flue gas stream 212 after 214B the air preheater unit 216.

EXAMPLES

Example 1

A first baseline sample (Sample B1) is obtained for comparison to the sorbent compositions disclosed herein. Sample B1 is a commercial sorbent that is sold under the trademark FastPAC® by ADA Carbon Solutions (Littleton, Colo.). Sample B1 comprises a powdered activated carbon (PAC) that is derived from a lignite coal feedstock, and has a median particle size (D50) of about 13 μm.

Example 2

A sample according to the present disclosure (Sample D2) is formed by modifying Sample B1 with ferric sulfate ($Fe_2(SO_4)_3$) and sodium thiocyanate (NaSCN). Sample D2 is prepared by spraying a solution containing both ferric sulfate and sodium thiocyanate onto about 50 grams of Sample B1 over a period of about 10 minutes while the PAC is being mixed in a fluidized mixing vessel. Sufficient solution is sprayed onto the PAC so that about 1 wt. % of iron and about 4.3 wt. % of sodium thiocyanate are deposited onto the PAC after drying.

Example 3

A further sample according to the present disclosure (Sample D3) is formed by modifying Sample B1 with ferric sulfate ($Fe_2(SO_4)_3$) and ammonium thiocyanate ($NH_4SCN$). Sample D3 is prepared by spraying a solution containing ferric sulfate onto about 50 grams of Sample 1 over a period of about 10 minutes while the PAC is being mixed in a fluidized mixing vessel. The addition of ferric sulfate is followed by spraying a solution containing ammonium thiocyanate onto the PAC while the PAC to be mixed in a fluidized mixing vessel. A sufficient amount of the solutions is sprayed onto the PAC in sequence so that about 2 wt. % iron and about 3 wt. % ammonium thiocyanate are deposited onto the PAC after drying.

Example 4

A further sample according to the present disclosure (Sample D4) is formed by modifying Sample B1 with ferrous sulfate ($FeSO_4$) and sodium thiocyanate (NaSCN). Sample D4 is prepared by spraying a solution containing both ferrous sulfate and sodium thiocyanate onto about 50 grams of Sample B1 over a period of about 10 minutes while the PAC is being mixed in a fluidized mixing vessel. Sufficient solution is sprayed onto the PAC so that about 1.1 wt. % iron and about 3.3 wt. % sodium thiocyanate are deposited onto the PAC after drying.

Example 5

A further sample according to the present disclosure (Sample D5) is formed by modifying Sample B1 with copper sulfate ($CuSO_4$) and sodium thiocyanate (NaSCN). Sample D5 is prepared by spraying a solution containing both copper sulfate and sodium thiocyanate onto about 50 grams of Sample B1 over a period of about 10 minutes while the PAC is being mixed in a fluidized mixing vessel. Sufficient solution is sprayed onto the PAC so that about 0.5 wt. % copper and about 2.2 wt. % sodium thiocyanate are deposited onto the PAC after drying.

Example 6

A comparative sample (Sample C6) is formed by modifying Sample B1 with ferric sulfate ($Fe_2(SO_4)_3$). Sample C6 is prepared by spraying a solution containing ferric sulfate onto about 50 grams of Sample B1 over a period of about 10 minutes while the PAC is being mixed in a fluidized mixing vessel. Sufficient solution is sprayed onto the PAC so that about 1 wt. % iron is deposited onto the PAC after drying.

Example 7

A comparative sample (Sample C7) is formed by modifying Sample B1 with ferrous sulfate ($FeSO_4$). Sample C7 is prepared by spraying a solution containing ferrous sulfate onto about 50 grams of Sample B1 over a period of about 10 minutes while the PAC is being mixed in a fluidized mixing vessel. Sufficient solution is sprayed onto the PAC so that about 1.6 wt. % iron is deposited onto the PAC after drying.

Example 8

A comparative sample (Sample C8) is formed by modifying Sample B1 with copper sulfate ($CuSO_4$). Sample C8 is prepared by spraying a solution containing copper sulfate onto about 50 grams of Sample 1 over a period of about 10 minutes while the PAC is being mixed in a fluidized mixing vessel. Sufficient solution is sprayed onto the PAC so that 1 wt. % of copper is deposited onto the PAC after drying.

Example 9

A comparative sample (Sample C9) is formed by modifying Sample B1 with sodium thiocyanate (NaSCN). Sample C9 is prepared by spraying a solution containing sodium thiocyanate onto about 50 grams of Sample B1 over a period of about 10 minutes while the PAC is being mixed in a fluidized mixing vessel. Sufficient solution is sprayed onto the PAC so that about 5 wt. % of sodium thiocyanate is deposited onto the PAC after drying.

Example 10

A comparative sample (Sample C10) is formed by modifying Sample B1 with phosphoric acid ($H_3PO_4$) and ammonium thiocyanate ($NH_4SCN$). Sample C10 is prepared by spraying a phosphoric acid solution and solution containing ammonium thiocyanate onto about 50 grams of Sample B1, in sequence, over a period of about 10 minutes while the PAC is being mixed in a fluidized mixing vessel. Sufficient solution is sprayed onto the PAC so that about 5 wt. % of ammonium thiocyanate is deposited onto the PAC after drying.

DMI Test

The ability to capture mercury may be measured by a dynamic mercury index (DMI) test developed by ADA Carbon Solutions, LLC and that measures mercury (Hg) captured in micro-grams of Hg per gram of sorbent composition (μg Hg/g sorbent composition) in a flowing mercury-laden gas stream at elevated temperatures. An increase in, or higher DMI, or μg Hg/g carbon (μg/g) captured, is an indication of a higher mercury capture efficiency of a sorbent. The DMI test simulates conditions in a coal burning facility's flue gas stream. The test system includes a preheater, sorbent feed, mercury feed, and reaction chamber. The mercury is fed into a reactor chamber along with the sorbent composition, wherein they are entrained. Uncaptured mercury is analyzed and DMI calculated. Temperature of the entrained mercury and sorbent is kept at about 325° F. (163° C.). Air entrainment and injection rates of between about 1 and about 5 lb./MMacf (pounds sorbent per one million actual cubic feet) are maintained such that residence time of the sorbent in the reaction chamber is about one second to simulate electrical generation unit (EGU) facility conditions. The initial mercury concentration in the system is approximately 10 μg/m³.

Each of the foregoing samples is measured to determine its DMI, and the results are listed in Table III.

TABLE III

| | Mercury Capture Performance | | | | |
|---|---|---|---|---|---|
| Sample | Metal | Wt. % | Sulfur-Containing Anion | Wt. % | DMI (ug Hg/g sorbent composition) |
| B1 | N/A | N/A | N/A | N/A | 20 |
| D2 | Fe (III) | 1.0 | NaSCN | 4.3 | 321 |
| D3 | Fe (III) | 2.0 | $NH_4SCN$ | 3.0 | 253 |
| D4 | Fe(II) | 1.1 | NaSCN | 3.3 | 299 |
| D5 | Cu(II) | 0.5 | NaSCN | 2.2 | 222 |
| C6 | Fe(III) | 1.0 | N/A | N/A | 47 |
| C7 | Fe(II) | 1.6 | N/A | N/A | 110 |
| C8 | Cu(II) | 1.0 | N/A | N/A | 152 |
| C9 | — | — | NaSCN | 5.0 | 38 |
| C10 | — | — | $NH_4SCN$ | 5.0 | 64 |

On their own, sulfur-containing compounds combined with a base sorbent (Samples C9 and C10) give relatively low mercury removal performance, in the range of 38-64 ug Hg/g sorbent. Similarly, non-halogen metal compounds alone with a base sorbent (Samples C6 to C8) remove mercury in the range of 47-152 ug Hg/g sorbent. There is synergism when the two components are incorporated together in the sorbent, and even with lower additive levels, and performance up to around 222-321 ug Hg/g sorbent can be achieved. See Samples D2 to D5. The combination of the specified metals and a low oxidation state sulfur compounds can give mercury removal performance at least equivalent to standard halogenated activated carbons.

While not wishing to be bound to any particular theory, this synergy is believed to be caused by the selected metal activating the sulfur compound so that the sulfur compound is more reactive to mercury in the flue gas. For the case of thiocyanate, the metal cation attracts the nitrogen, effectively pulling electron density away from the sulfur compound. Thus, the sulfur atom is more reactive to mercury in the flue gas. Alternatively, the mechanism may involve two steps where the metal first oxidizes elemental mercury, and the oxidized mercury is sequestered on the sorbent by the low oxidation state sulfur compound.

While various embodiments of a sorbent composition and a method for the treatment of a flue gas stream have been described in detail, it is apparent that modifications and adaptations of those embodiments will occur to those skilled in the art. However, it is to be expressly understood that such modifications and adaptations are within the spirit and scope of the present disclosure.

What is claimed is:

1. A free-flowing sorbent composition comprising:
   carbonaceous particulates having a median particle size of at least about 2 µm and not greater than about 50 µm, a total pore volume of at least about 0.2 cc/g, and a ratio of micropore volume to mesopore volume of at least about 0.7 and not greater than about 1.5;
   a non-halogen metal compound comprising a metal cation; and
   an inorganic sulfur-containing compound, wherein at least a portion of the sulfur in the inorganic sulfur-containing compound has an oxidation state of equal to or less than +4,
   wherein the non-halogen metal compound and the inorganic sulfur-containing compound are coated onto and/or impregnated in at least a portion of the carbonaceous particulates.

2. The free-flowing sorbent composition recited in claim 1, wherein the sorbent composition comprises not greater than about 0.5 wt. % halogens.

3. The free-flowing sorbent composition recited in claim 1, wherein the sorbent composition comprises substantially no halogens.

4. The free-flowing sorbent composition recited in claim 1, wherein the carbonaceous particulates are activated carbon.

5. The free-flowing sorbent composition recited in claim 1, where the carbonaceous particulates are derived from coal.

6. The free-flowing sorbent composition recited in claim 1, wherein the carbonaceous particulates have a median particle size of not greater than about 30 µm.

7. The free-flowing sorbent composition recited in claim 1, wherein the carbonaceous particulates have a total pore volume of at least about 0.3 cc/g and a ratio of micropore volume to mesopore volume of at least about 0.9 and not greater than about 1.5.

8. The free-flowing sorbent composition recited in claim 1, wherein the carbonaceous particulates have a surface area of at least about 350 $m^2/g$.

9. The free-flowing sorbent composition recited in claim 1, wherein the metal cation is selected from the group consisting of cations of Fe, Cu, V, Mn, Co, Ni, and Zn.

10. The free-flowing sorbent composition recited in claim 9, where the metal cation has an oxidation state of +2 or +3.

11. The free-flowing sorbent composition recited in claim 1, wherein the non-halogen metal compound is selected from the group consisting of a sulfate compound and a nitrate compound.

12. The free-flowing sorbent composition recited in claim 11, wherein the non-halogen metal compound is selected from the group consisting of $Fe_2(SO_4)_3$, $FeSO_4$, and $CuSO_4$.

13. The free-flowing sorbent composition recited in claim 1, wherein the sorbent composition comprises at least about 0.1 wt. % of the metal cation.

14. The free-flowing sorbent composition recited in claim 1, wherein the sorbent composition comprises at least about 0.5 wt. % of the metal cation.

15. The free-flowing sorbent composition recited in claim 1, wherein the sorbent composition comprises not greater than about 20 wt. % of the metal cation.

16. The free-flowing sorbent composition recited in claim 1, wherein the sulfur in the inorganic sulfur-containing compound is a constituent of a sulfur-containing anion.

17. The free-flowing sorbent composition recited in claim 16, wherein the sulfur-containing anion is selected from the group consisting of thiocyanate $(SCN)^{1-}$, tetrathionate $(S_4O_6)^{2-}$, and polythionate $(SO_3-S_n-SO_3)^{2-}$.

18. The free-flowing sorbent composition recited in claim 1, wherein the sorbent composition comprises is at least about 0.1 wt. % sulfur from the inorganic sulfur-containing compound.

19. The free-flowing sorbent composition recited in claim 1, wherein the sorbent composition comprises not greater than about 25 wt. % sulfur from the inorganic sulfur-containing compound.

20. The free-flowing sorbent composition recited in claim 1, wherein the non-halogen metal compound is different from the inorganic sulfur-containing compound.

21. The free-flowing sorbent composition recited in claim 1, wherein the inorganic sulfur-containing compound does not comprise elemental sulfur.

22. A free flowing sorbent composition comprising:
    a carbonaceous particulate sorbent having a median particle size of at least about 2 and not greater than about 50 µm, a total pore volume of at least about 0.2 cc/g, and a ratio of micropore volume to mesopore volume of at least about 0.7 and not greater than about 1.5;
    a non-halogen metal compound comprising a metal cation; and
    an inorganic sulfur-containing compound comprising a sulfur-containing anion selected from the group consisting of thiocyanate $(SCN)^{1-}$, tetrathionate $(S_4O_6)^{2-}$, and polythionate $(SO_3-S_n-SO_3)^{2-}$.

23. The free-flowing sorbent composition recited in claim 22, wherein carbonaceous particulate sorbent comprises activated carbon.

24. The free-flowing sorbent composition recited in claim 22, wherein the carbonaceous particulate sorbent has a total pore volume of at least about 0.3 cc/g and a surface area of at least about 350 $m^2/g$.

25. The free-flowing sorbent composition recited in claim 22, wherein the metal cation is selected from the group consisting of cations of Fe, Cu, V, Mn, Co, Ni, and Zn.

26. The free-flowing sorbent composition recited in claim 22, wherein the non-halogen metal compound is selected from the group consisting of a sulfate compound and a nitrate compound.

27. The free-flowing sorbent composition recited in claim 22, wherein the non-halogen metal compound is selected from the group consisting of $Fe_2(SO_4)_3$, $FeSO_4$, and $CuSO_4$.

28. The free-flowing sorbent composition recited in claim 22, wherein the sorbent composition comprises at least about 0.1 wt. % and not greater than about 20 wt. % of the metal cation.

29. The free-flowing sorbent composition recited in claim 22, wherein the sorbent composition comprises is at least about 0.1 wt. % and not greater than about 25 wt. % sulfur from the inorganic sulfur-containing compound.

30. The free-flowing sorbent composition recited in claim 22, wherein the sorbent composition comprises substantially no halogens.

31. The sorbent composition recited in claim 22, wherein the non-halogen metal compound and the inorganic sulfur-containing compound are coated onto and/or impregnated in the carbonaceous particulate sorbent.

32. The sorbent composition recited in claim 22, wherein the sulfur-containing anion is selected from the group consisting of tetrathionate $(S_4O_6)^2$ and polythionate $(SO_3-S_n-SO_3)^{2-}$.

33. A sorbent composition comprising:
a free-flowing carbonaceous particulate sorbent having a median particle size of at least about 2 μm and not greater than about 50 μm, a total pore volume of at least about 0.2 cc/g, and a ratio of micropore volume to mesopore volume of at least about 0.7 and not greater than about 1.5;
a non-halogen metal-containing compound comprising a metal cation selected from the group consisting of Fe, Cu, V, Mn, Co, Ni, and Zn; and
an inorganic sulfur-containing compound comprising a sulfur-containing anion selected from the group consisting of thiocyanate $(SCN)^{1-}$, tetrathionate $(S_4O_6)^2$ and polythionate $(SO_3-S_n-SO_3)^{2-}$.

34. The sorbent composition recited in claim 33, wherein the free-flowing carbonaceous particulate sorbent comprises activated carbon.

35. The sorbent composition recited in claim 33, wherein the non-halogen metal-containing compound and the inorganic sulfur-containing compound are coated onto and/or impregnated in the free-flowing carbonaceous particulate sorbent.

* * * * *